United States Patent [19]
Babilas

[11] Patent Number: 4,623,043
[45] Date of Patent: Nov. 18, 1986

[54] AUTOMATIC WHEEL CHAIR BRAKE

[76] Inventor: John Babilas, 170 Newell St., Brooklyn, N.Y. 11222

[21] Appl. No.: 705,871

[22] Filed: Feb. 26, 1985

[51] Int. Cl.$^4$ ............................................. B60T 1/04
[52] U.S. Cl. ............................. 188/2 F; 188/106 R; 188/109; 280/242 WC; 280/289 WC; 297/DIG. 4
[58] Field of Search .......... 188/2 F, 109, 105, 106 R, 188/167, 174, 178, 72.7, 72.9; 280/242 WC, 289 WC; 74/110, 104, 107; 297/DIG. 4

[56] References Cited
U.S. PATENT DOCUMENTS

| | | | |
|---|---|---|---|
| 4,268,054 | 5/1981 | Twitchell et al. | 188/2 F X |
| 4,320,818 | 3/1982 | Knoche | 188/2 F |
| 4,350,227 | 9/1982 | Knoche | 188/2 F |
| 4,476,964 | 10/1984 | Broman | 188/109 |

Primary Examiner—Douglas C. Butler
Assistant Examiner—Michael P. Gilday
Attorney, Agent, or Firm—Richard L. Miller

[57] ABSTRACT

An automatic wheelchair brake is provided which automatically locks both wheels when a patient attempts to rise from the wheelchair. While seated the patient manually operates a three-way lever brake with manually locked, manually unlocked and automatic positions. If the patient attempts to rise while the brake lever is in the manually unlocked position, the lever automatically returns to the automatic position and both wheels still lock automatically. After the patient has exited, the wheelchair may easily be moved by shifting the operating lever to the manual unlock position.

5 Claims, 6 Drawing Figures

AUTOMATIC WHEEL CHAIR BRAKE

BACKGROUND OF THE INVENTION

The present invention relates generally to the field of wheel chairs, and, more specifically to brake systems which allow the safe operation thereof.

At the present state-of-the-art, almost all wheelchairs use a locking lever system in which a wheelchair user must remember to lock both wheels of the wheel chair before attempting to rise or before being transferred with the help of an ambulatory party such as a nurse. If the patient or helper doesn't remember to lock the brakes, the wheel chair may roll backward and injure the patient who may then fall. Depending upon the slope of the surface upon which the wheelchair is located, the wheelchair may freewheel away and be lost or damaged. Patients often forget to set the brakes because of mental infirmities brought on by old age, due to drug induced drowsiness, or because of other pre-occupations. Some patients are also unable to operate side-mounted levers because of physical infirmities such as quadriplegia and hemiplegia.

A number of inventions have been proposed to deal with this problem. For example, H. M. Eagelson, Jr. et. al. (U.S. Pat. No. 3,302,757) provided an automatic immobilizing device; H. E. Marshall (U.S. Pat. No. 3,529,700) provided a brake assembly for wheelchairs; and R. E. Knoche (U.S. Pat. No. 4,350,227) provided a wheelchair brake assembly; however, none of the referenced inventions provides the fully automatic operation and safety features addressed by the present invention.

SUMMARY OF THE INVENTION

It is, therefore, a primary object of the present invention to provide an automatic wheel chair brake which locks both wheels whenever the patient attempts to rise from a sitting position. This is accomplished by using an automatic actuating arm which the patient normally sits upon. When the patient attempts to rise, this arm rotates upwards, locking both wheels.

Another object is to provide an automatic wheel chair which may be manually operated by hand-operated lever type locks mounted on the sides of the wheel chair which may be operated by the seated patient.

A further object is to provide an automatic wheel chair brake which automatically locks the wheels when a patient attempts to rise even though the manual lever brake handle has been left in the unlocked position. This is accomplished by providing the operating lever with three positions: a locked position, an unlocked position, and a center, automatic, position. When the lever is set to the unlocked position, and the patient occupies the chair, the operating handle automatically reverts to the automatic position, and the wheels lock as the patient rises.

A yet further object is to provide an automatic wheel chair whose lever brake system is operable by an ambulatory helping party even though there is no patient in the wheel chair.

A still further object is to provide an automatic wheel chair in which the automatic operating mechanism may be easily retrofitted to existing wheelchairs.

Another further object is to provide an automatic wheel chair which is reliable in operation, easy to use, and inexpensive to fabricate.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
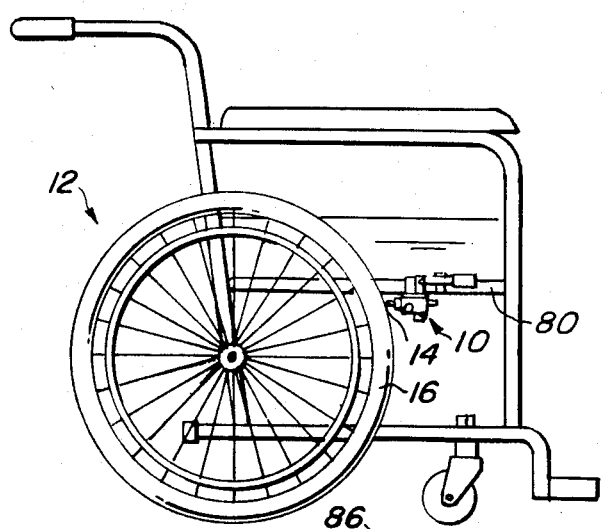
FIG. 1 is a side elevational view of a conventional wheel chair incorporating the invention.
Figure 2:
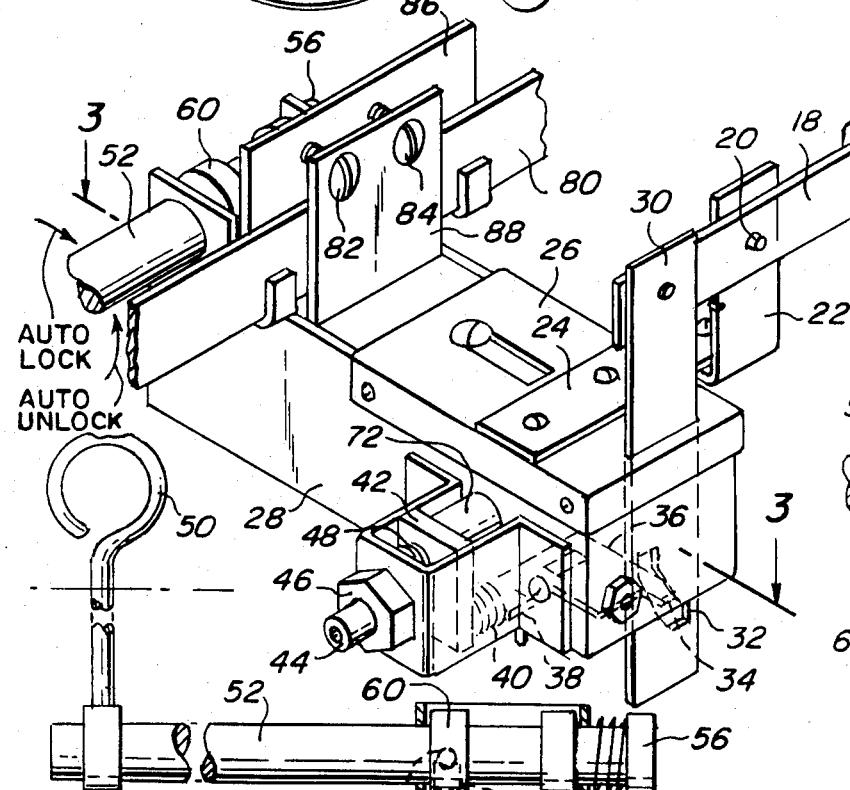
FIG. 2 is a perspective view with parts broken away of the invention.
Figure 5:
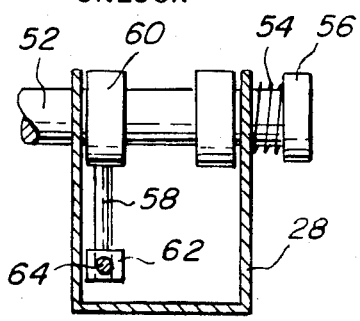
FIG. 5 is a cross sectional view taken on line 5—5 in FIG. 3.
Figure 3:
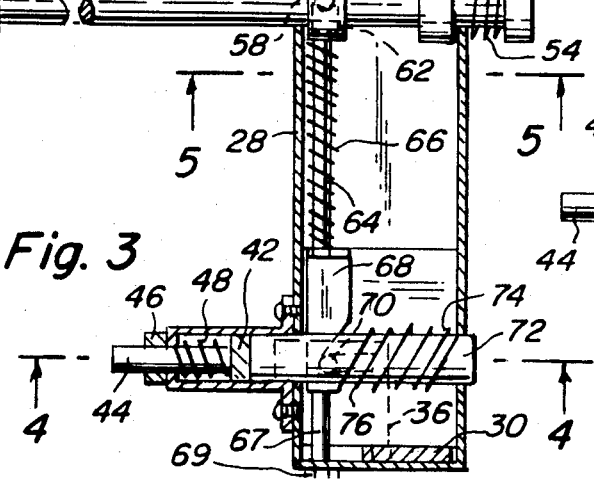
FIG. 3 is a cross sectional view taken on line 3—3 in FIG. 2.
Figure 4:
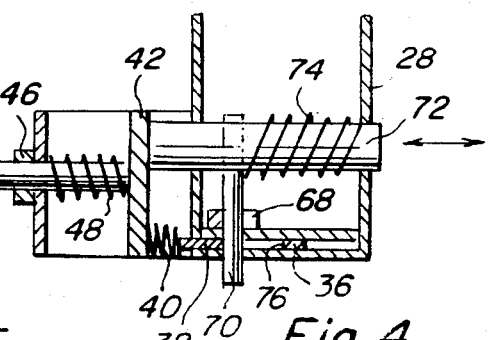
FIG. 4 is a cross sectional view taken on line 4—4 in FIG. 3.
Figure 6:
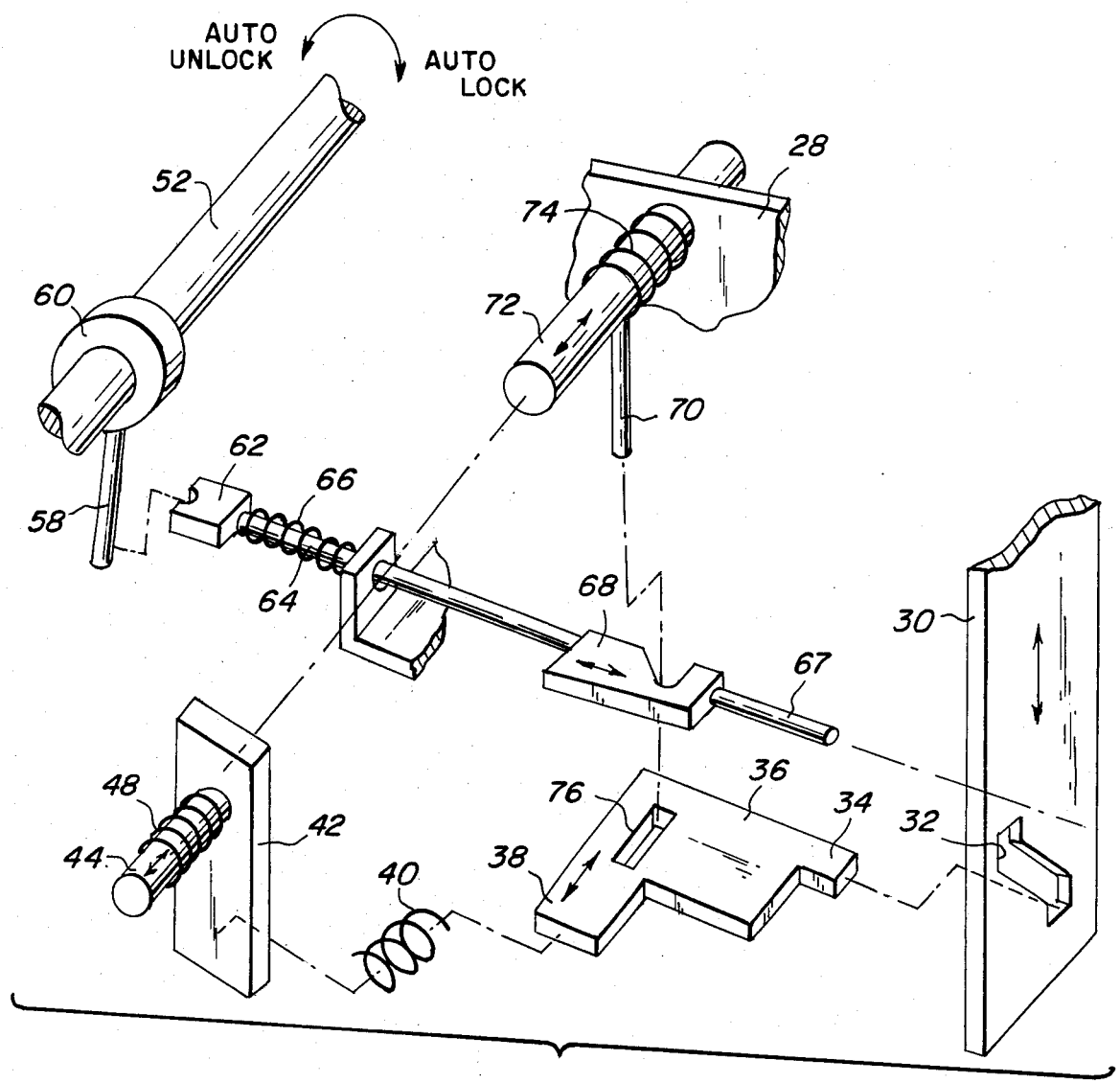
FIG. 6 is an exploded perspective view of the invention with parts broken away in order to illustrate the internal cooperation of the components of the invention.

FIG. 1 illustrates the use of the wheel chair brake 10 applied to a conventional wheelchair 12. The automatic wheelchair brake 10 controls the motion of wheelchair 12 by a friction braking system in which brake shoe 14 indents into rubber rim 16. Although only one wheel and one braking system are illustrated, it is understood that the unseen wheel may be equipped with a duplicate automatic brake system.

The wheel chair brake 10 is attached to wheelchair crossbar 80 by tightening screws 82 and 84 which secure crossbar mounting plate 86 to mounting bracket 88.

The operation of the invention may best be understood by first considering the operation of the manual lever actuated brake system and then considering the operation of the automatic brake system. Finally, the interaction between the two will be considered.

Operating lever 18 is free to move upward into a manual lock position, downward into a manual unlock position or may be left in a center automatic position as indicated by arrows. Operating lever 18 is cantilevered at pivot 20 which is supported by pivot plate 22 and pivot plate arm 24 which is screwed to cover plate 26, which is, in turn screwed to base 28. Operating lever 18 moves cam plate 30 up and down. Cam plate 30 is equipped with a three-position cam 32 which has a rectangular opening at the top, which becomes an oblique slot angled toward the back of the plate and finally ends in another rectangular slot at the bottom of the aperture. A protrusion 34 in sliding plate 36 causes sliding plate 36 to move forward and backward as cam plate 30 moves up and down. When edge 38, of sliding plate 36 slides forward it compresses brake actuating spring 40 which biases brake shoe plate 42. As brake shoe plate 42 moves, brake shoe 44 also moves, guided by bushing 46.

Manual application of the brake. When operating lever 18 is shifted upwards, cam plate 30 moves downward, causing sliding plate 36 to move forwards and at the same time protrusion 34 is locked in the upper rectangular part of three-position cam 32. Edge 38 of sliding plate 36 compresses brake actuating spring 40 and brake shoe 44 moves forward locking the wheels of the wheelchair. The resilience of brake actuating spring 40 compensates for normal variations in the diameter of the wheelchair's rim.

Manual unlocking of the brake. When the brake is to be released, operating lever 18 is shifted all the way down to the manual unlock position as illustrated. Cam plate 30 moves upward, causing sliding plate 36 to move backward and at the same time protrusion 34 is locked in the lower rectangular part of three-position cam 32. Biasing pressure on brake actuating spring 40 is released, and brake shoe 44 retracts with the assistance of brake shoe return spring 48.

Automatic operation of the brake. Operating lever 18 is in the central Automatic position as illustrated. Assume that a patient is sitting upon automatic actuating arm 50. When the patient attempts to rise, actuating arm 50 rotates with automatic actuating shaft 52, in the direction of the auto lock arrow due to the rotary biasing of automatic actuating arm with partial assistance of return spring 54 which is attached to collar 56 and the force supplied by spring 66. Shaft pin 58, which is attached to actuating arm shaft 52 by collar 60, rests in cradle 62. Linkpin 64, which is biased by linkpin return spring 66, is guided by linkpin extension 67 and is capped by nut 69, and moves along with linear cam 68.

Conversely when the patient begins to sit, a full brake release will be effected when bar pin 70 moves to rest on flat portion of the linear cam link 68 shown as the outer edge of the cam link member 68 at the end of the angular portion thereof, because the force is applied to the cradle 62 by pin 58 and spring 66 is compressed.

Brake actuating bar pin 70, which projects from brake actuating bar 72, rides in linear cam 68 and, in the braking position, is fully extended by biasing due to brake activating bar return spring 74. Brake activating bar 72 presses against brake shoe plate 42 and forces brake shoe 44 against the wheelchair's rim. The resilience of brake activating bar return spring 74 allows for normal variations in the diameter of the rim.

When a patient returns to the wheelchair and sits on automatic actuating arm 50, automatic actuating shaft 52 rotates in the auto unlock direction as shown by the arrow. Linkpin 64 advances linear cam 68, causing brake actuating bar 72 to be withdrawn from contact with brake shoe plate 42. Brake shoe plate 42 and brake shoe 44 are then withdrawn by the biasing forces due to brake shoe return spring 48 and the wheel is unlocked.

The range of motion of brake actuating bar 72 is limited not only by linear cam 68 but also by rectangular aperture 76 in sliding plate 36. When sliding plate 36 is withdrawn, as is the case when operating lever 18 is shifted to the manual unlock position, brake actuating bar 72 is locked in its retracted position. This assures absolute control of the braking system by the manual brake when the patient is sitting.

If the patient happens to sit while operating lever 18 is in the manual unlock position lateral motion of cam 68 will relieve the pressure pin 70 against sliding plate 36 allowing cam plate 30 to drop in to the automatic position, and thus the brakes will apply as the patient rises. The wheelchair can then be moved by shifting the manual lever from the central automatic position into the manual unlock position.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. An automatic wheel chair brake acting upon a rim of one of the wheels of the wheel chair, comprising:
   a brake shoe for locking against the rim of the wheel;
   a manually operated brake system for engaging the brake shoe and having a manual operating lever movable between a locked position and an unlocked position;
   an automatic brake system also engaging the brake shoe and including an automatic actuating arm positioned with respect to the wheel chair such that when a user sits on the wheel chair the brake shoe is unlocked regardless of the position of the manual operating lever, and when a user rises from the wheel chair the brake shoe is locked, regardless of the position of the manual operating lever;
   wherein said manually operated brake system comprises an operating lever which is centrally pivoted; a cam plate having a cam opening which moves in a vertical plane when said operating lever is actuated; a sliding plate with a protrusion which projects into said cam opening in said cam plate whereby said sliding plate moves laterally in a horizontal plane when said cam plate moves up and down; a brake actuating spring which is compressed when said sliding plate moves in a forward direction; a brake shoe plate whibh biased in a forward direction when said brake actuating spring is compressed; a brake shoe integral to said brake shoe plate, wherein said brake shoe engages said rim of said wheel chair when said brake shoe is laterally biased; and a brake shoe return spring that returns said brake shoe plate and said integral brake shoe to an unlocked position when biasing pressure is released by the return of said operating lever to an unlocked position.

2. An automatic wheel chair brake, as recited in claim 1, wherein said cam opening of said cam plate contains a three-position cam having a cut out portion which is rectangular at its uppermost extension, continues obliquely downwards, and is rectangular again at its lowermost extension; whereby said protruding part of said sliding plate engages said three-position cam such that when said cam plate is shifted to its uppermost position, said sliding plate is locked as far back as it can travel; when said cam plate is shifted to a central position, said sliding plate is free to move back and forth; and, when said cam plate is shifted to its lowermost position, said sliding plate is locked as far forward as it can travel.

3. An automatic wheel chair brake, as recited in claim 1, wherein said automatic brake system comprises: an automatic actuating arm together with an automatic actuating arm return spring, whereby said arm is held down when a wheelchair user sits upon it and whereby said arm is rotated by said automatic actuating arm spring to a return position when said wheel chair user rises; a shaft which is rotated by the action of said automatic actuating arm; a shaft pin projecting radially from said said shaft wherein said pin rotates along with said shaft; a cradle into which said shaft pin nests, wherein, when said shaft is rotated, said cradle is displaced laterally along with a linkpin attached to said cradle; a linear cam attached to said linkpin which travels along with said linkpin; a brake actuating bar pin which engages said linear cam and moves back and forth as said linear cam moves from side to side; a brake activating bar which is advanced and retracted by said brake actuating bar pin; and a brake actuating bar return spring which biases said brake actuating bar when said linear cam permits movement; and further wherein said brake actuating bar engages said brake shoe plate and said integral brake shoe, thereby allowing automatic operation of said brake shoe when said wheel chair user rises.

4. An automatic wheel chair brake, as recited in claim 3, wherein said said sliding plate further includes a rectangular aperture into which said brake activating bar pin projects after engaging said linear cam; whereby, when said operating lever is in its unlocked position, the automatic operation of said brake actuating bar is prevented by securing said bar in an unlocked position, regardless of the position of said automatic actuating arm, thereby permitting the movement of said wheel chair without a seated user.

5. An automatic wheel chair brake, as recited in claim 4, further comprising an operating lever return spring which shifts said cam plate and said attached operating lever from the manually locked position when lateral pressure is exerted by said brake activating bar return spring against said rectangular aperture in said sliding plate when said wheel chair user rises.

* * * * *